(12) United States Patent
Perrotton et al.

(10) Patent No.: US 8,626,687 B2
(45) Date of Patent: Jan. 7, 2014

(54) METHOD FOR THE SELECTION OF ATTRIBUTES FOR STATISTICAL LEARNING FOR OBJECT DETECTION AND RECOGNITION

(75) Inventors: Xavier Perrotton, Paris (FR); Marc Sturzel, Montrouge (FR)

(73) Assignee: European Aeronautic Defence and Space Company-Eads France, Paris (FR)

( * ) Notice: Subject to any disclaimer, the term of this patent is extended or adjusted under 35 U.S.C. 154(b) by 188 days.

(21) Appl. No.: 13/201,287

(22) PCT Filed: Feb. 19, 2010

(86) PCT No.: PCT/EP2010/052110
§ 371 (c)(1),
(2), (4) Date: Sep. 8, 2011

(87) PCT Pub. No.: WO2010/094759
PCT Pub. Date: Aug. 26, 2010

(65) Prior Publication Data
US 2012/0072383 A1    Mar. 22, 2012

(30) Foreign Application Priority Data
Feb. 19, 2009 (FR) .................................... 09 51086

(51) Int. Cl.
*G06N 3/08* (2006.01)
*G06K 9/00* (2006.01)

(52) U.S. Cl.
CPC ... *G06N 3/08* (2013.01); *G06K 9/00* (2013.01)
USPC ............................................ 706/25; 382/181

(58) Field of Classification Search
None
See application file for complete search history.

(56) References Cited

U.S. PATENT DOCUMENTS

| | | | |
|---|---|---|---|
| 7,564,994 B1* | 7/2009 | Steinberg et al. | 382/118 |
| 2007/0237387 A1 | 10/2007 | Avidan et al. | |
| 2010/0040285 A1* | 2/2010 | Csurka et al. | 382/170 |
| 2010/0092085 A1* | 4/2010 | Marchesotti | 382/173 |
| 2010/0111396 A1* | 5/2010 | Boucheron | 382/133 |

OTHER PUBLICATIONS

Perrotton et al; "Automatic Object Detection on Aerial Images Using Local Descriptors and Image Synthesis", Computer Vision Systems, May 12, 2008, vol. 5008, pp. 302-311, ISBN: 978-3-540-79546-9.
Torralba et al; "Sharing Visual Features for Multiclass and Multiview Object Detection", IEEE Transactions on Pattern Analysis and Machine Intelligence, May 1, 2007, vol. 29, No. 5, pp. 854-869, ISSN: 0162-8828.
Porway et al; "A hierarchical and contextual model for aerial image understanding", Computer Vision and Pattern Recognition, Jun. 23, 2008 pp. 1-8, ISBN: 978-1-4244-2242-5.

(Continued)

*Primary Examiner* — Alan Chen
(74) *Attorney, Agent, or Firm* — Pearne & Gordon LLP

(57) ABSTRACT

The invention relates to an attribute selection method for making statistical learning of descriptors intended to enable automatic recognition and/or detection of an object from a set of images, method characterized by the following steps:
- obtain a mask of the object in each image containing said object to be recognized,
- define and select at least one set of descriptors as a function of their geometric shape and/or apparent specific physical characteristics,
- calculate attributes associated with this shape and said specific physical characteristics,
- sort the descriptors as a function of their respective scores,
- select descriptors with the highest scores to perform said statistical learning.

5 Claims, 3 Drawing Sheets

(56) References Cited

OTHER PUBLICATIONS

Wang; "From Bag of Categories to Tree of Object Recognition", International Conference in Central Europe on Computer Graphics, Visualization and Computer Vision, Feb. 4, 2008.

French Preliminary Search Report for FR 09 51086 dated Sep. 18, 2009.
International Search Report for PCT/EP2010/052110 dated Apr. 29, 2010.

* cited by examiner

METHOD FOR THE SELECTION OF ATTRIBUTES FOR STATISTICAL LEARNING FOR OBJECT DETECTION AND RECOGNITION

TECHNICAL FIELD

The invention relates to supervised statistical learning applied to image processing and more specifically concerns a method for the selection of attributes to be used for statistical learning of descriptors intended to enable automatic recognition and/or detection of an object from a set of images.

The invention also relates to an attribute selection device for making statistical learning of descriptors intended to enable automatic recognition and/or detection of an object from a set of images.

The invention also relates to a computer program stored in a recording medium that, when run by a computer, will implement the method according to the invention.

STATE OF PRIOR ART

In known supervised statistical learning techniques, there is usually a set of learning data for example composed of an extended set of positive and negative example images, and a single or multi-class learning algorithm that uses descriptors calculated locally on these images, and that selects the most discriminating descriptors.

One problem with these techniques is due to the fact that there are far too many possible descriptors for an exhaustive search, such that the algorithm has to use only a limited number of possible solutions.

Known solutions for solving this problem consist of defining families of possible descriptors and processing all possible descriptors in these families. For example, for Haar filters, available filters correspond to predefined geometric patterns and all instantiations of these patterns are then tested in the learning images. On the other hand, any geometric patterns not initially defined will be ignored. In such an approach, it is essential to limit possible patterns, otherwise the number of descriptors to be tested becomes completely prohibitive.

The purpose of the invention is to overcome the disadvantages of prior art by means of a method for selection of attributes making it possible to make use of segmentation data in learning images and leaving the algorithm define geometric patterns that are the most relevant and the most discriminating as a function of the learning data used.

PRESENTATION OF THE INVENTION

The invention then recommends a method for the selection of attributes to perform statistical learning of descriptors intended to enable automatic recognition and/or detection of an object from a set of images comprising the following steps:
  obtain a mask of the object in each image containing said object to be recognised,
  define at least one set of descriptors using their geometric shape and/or apparent specific physical characteristics,
  select at least one set of descriptors as a function of their geometric shape and/or apparent specific physical characteristics,
  calculate the attributes associated with this shape and said specific physical characteristics,
  select at least one set of descriptors as a function of their shape and attributes calculated on this shape,
  for each descriptor and for each image, define a semantic conformity score starting from previously calculated masks,
  sort the descriptors as a function of their respective scores.

Preferably, the semantic conformity score of a descriptor is defined as a function of the conformity level of the geometric shape of said descriptor with the mask of the object to be recognised in the image.

According to another characteristic of the invention, said descriptors measure a statistical property on a combination of adjacent geometric shapes and non-adjacent geometric shapes.

In one variant embodiment, said geometric shapes are rectangles.

For example, the statistical property measurement may be a histogram difference.

In one embodiment of the invention, the mask of the object to be recognised in the image is obtained by image synthesis.

In this embodiment, the semantic conformity score of a descriptor is defined as a function of the conformity level of the geometric shape of said descriptor with the mask of the object to be recognised in the image.

The method according to the invention is implemented by means of an attribute selection device to perform statistical learning of descriptors for automatic recognition and/or detection of an object starting from a set of images, this device comprises:
  means for segmenting each image containing said object to be recognised,
  means for defining at least one set of descriptors as a function of their geometric shape and/or apparent specific physical characteristics such as the colour or the appearance of the object to be recognised,
  means for calculating attributes associated with this shape and said specific physical characteristics,
  means for selecting at least one set of descriptors as a function of their shape and attributes calculated on this shape,
  means for defining a semantic conformity score for each descriptor and for each image,
  means for sorting descriptors as a function of their respective scores,
  means for selecting descriptors with the highest scores to perform said statistical learning.

The method according to the invention is implemented using a computer program stored in a recording medium and comprising:
  instructions for obtaining a mask of the object in each image containing said object to be recognised,
  instructions for defining at least one set of descriptors as a function of their geometric shape and/or apparent specific physical characteristics (colour, appearance, etc.),
  instructions for calculating attributes associated with this shape and said specific physical characteristics,
  instructions for selecting at least one set of descriptors as a function of their shape and attributes calculated on this shape,
  instructions for defining a semantic conformity score from the previously calculated masks, for each descriptor and for each image,
  instructions for sorting the descriptors as a function of their respective scores,
  instructions for selecting the descriptors with the highest score to perform said statistical learning.

BRIEF DESCRIPTION OF THE DRAWINGS

Other characteristics and advantages of the invention will become clear from the following description taken as a non-limitative example with reference to the appended figures in which.

DETAILED PRESENTATION OF PARTICULAR EMBODIMENTS

Figure 1:
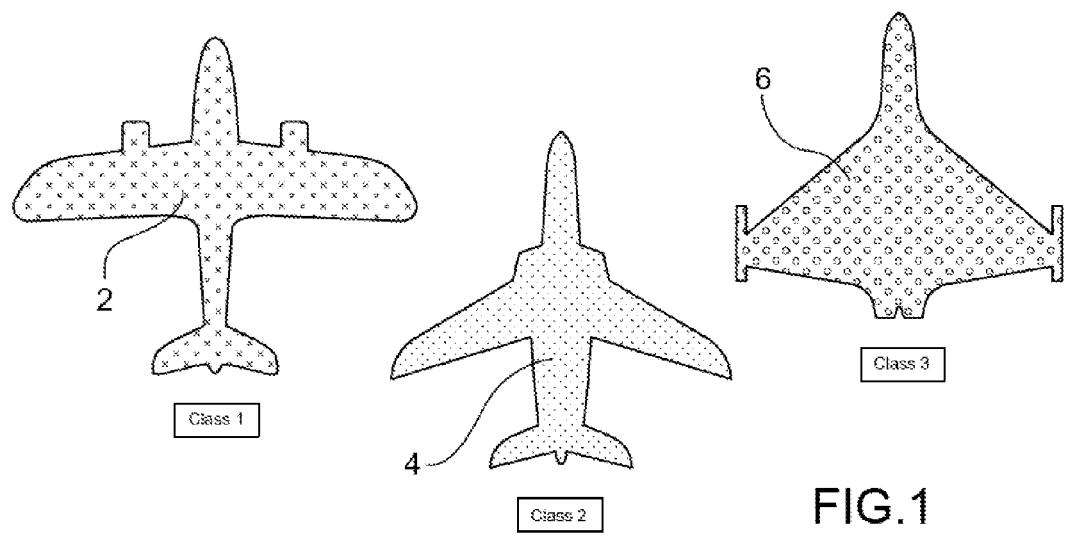
FIG. 1 diagrammatically shows three classes to be recognised by the method according to the invention.

FIG. 1 diagrammatically shows the silhouettes of three classes to be recognised, class 1, class 2 and class 3, corresponding to three aircrafts 2, 4 and 6 respectively of the same size obtained using a camera associated with the device according to the invention.

Note that the method according to the invention is implemented by a learning algorithm that focuses on the most specific zones of each class in order to select attributes for each class that will be used for statistical learning of descriptors to discriminate each of the aircrafts 2, 4 or 6 in an extended set of images.

Figure 2:
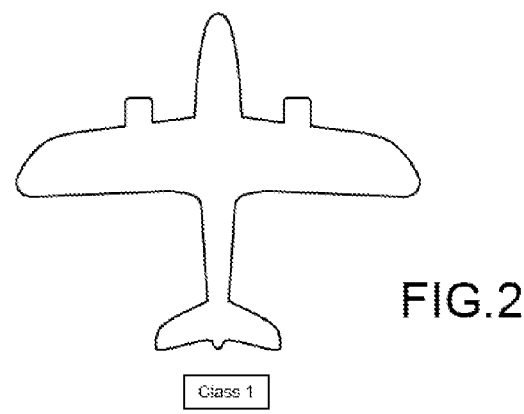
FIG. 2 diagrammatically shows a contour mask of an image of an aircraft in one of the classes in FIG. 1.

A mask is extracted representing contours of the object for each real image in the learning base. An example mask for class 1 is shown in FIG. 2.

Figure 3:
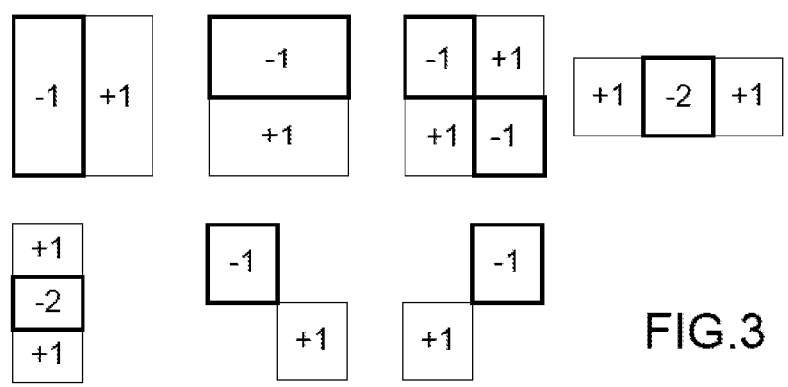
FIG. 3 diagrammatically shows an example of the descriptors considered.

In this example, we consider Haar filters that make a difference in contrast between regions of the image. FIG. 3 presents example shapes representing rectangles with two different contrast levels +1 and −1.

The next step is to calculate descriptors at any scale and position in the learning image. The result is then several thousand descriptors, and a semantic conformity score is defined for each descriptor and for each image, starting from the previously calculated masks.

Thus, a descriptor will have a higher semantic conformity score if it can semantically differentiate the background from the target.

In the example in FIG. 1, the score will be maximum and equal to 1 when each region is placed on a single region of the image, the background or the target, and these regions are opposite. Conversely, when the two regions are in the same zone, for example the background zone, the score will be minimum and zero.

The next step is to perform a classical sort of descriptors as a function of their respective scores from the lowest to the highest, and for example, the hundred descriptors with the highest scores will be selected.

In the example in FIG. 1, any descriptors calculating a distance between rectangular regions along the x and y axes is considered, for algorithmic optimisation choices. Regions associated with the background are cross-hatched vertically and regions associated with the object are cross-hatched horizontally.

Figure 4:
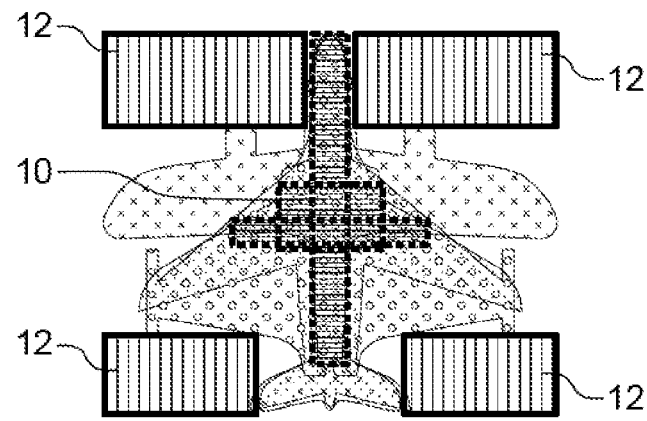
FIG. 4 diagrammatically shows discriminating regions common to the three classes in FIG. 1.

FIG. 4 shows the overlap of segmentation masks demonstrating zones 10 and 12 common to the three classes 2, 4 and 6. The combination of rectangles in zones 10 and 12 makes it possible of efficiently discriminating images that probably contain an object of one of the three aircraft classes in the background zones 12 common to the three classes.

In FIG. 5, zones specific to groups of two classes are considered, avoiding zones already considered by the previously defined descriptors.

Figure 5A:
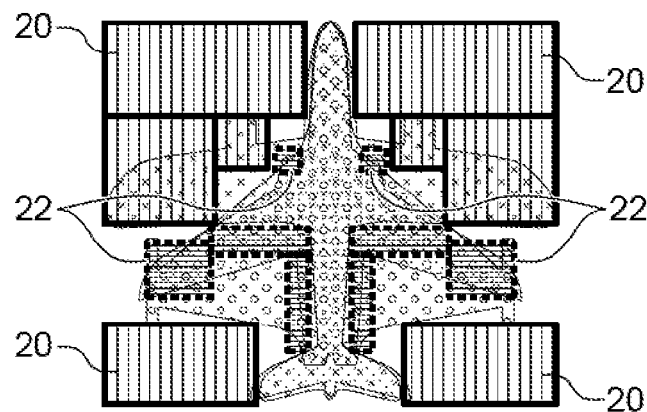
FIGS. 5A and 5B diagrammatically show discriminating regions characteristic of a subset of two classes in FIG. 1.
Figure 5B:
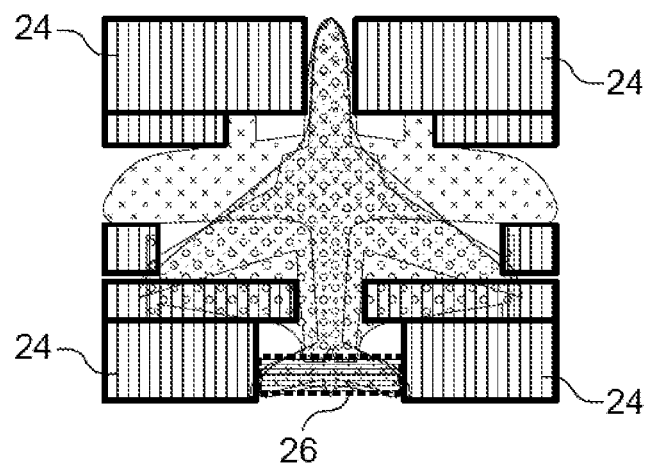

Thus, FIG. 5A considers zones 20 and 22 common to classes 4 and 6 and FIG. 5B considers zones 24, 26 common to classes 2 and 4.

As shown in FIG. 6, the algorithm focuses on the most specific zones in each of the classes as iterations in the learning phase continue, which makes it possible to eliminate background zones 12 at the beginning of the processing, to make the discrimination between classes at the end of the processing.

Figure 6A:
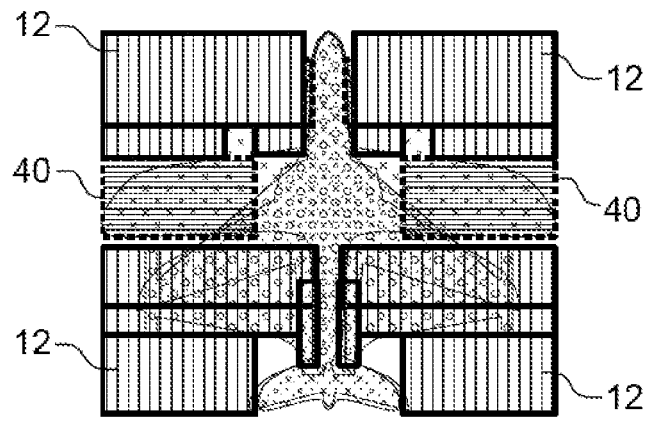
FIGS. 6A to 6C diagrammatically show characteristic discriminating regions for each class in FIG. 1.
Figure 6B:
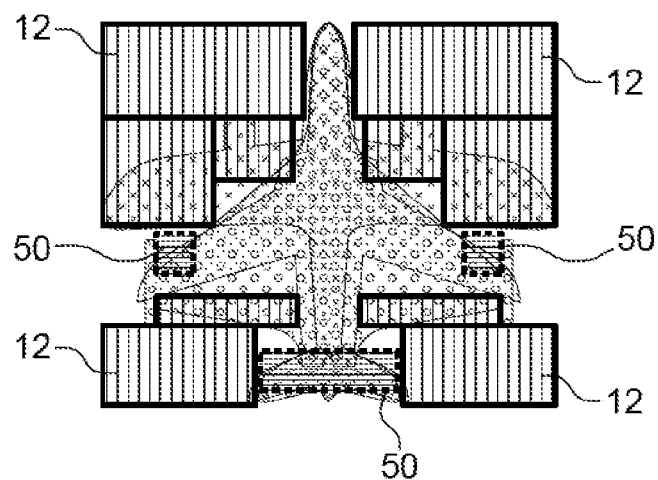
Figure 6C:
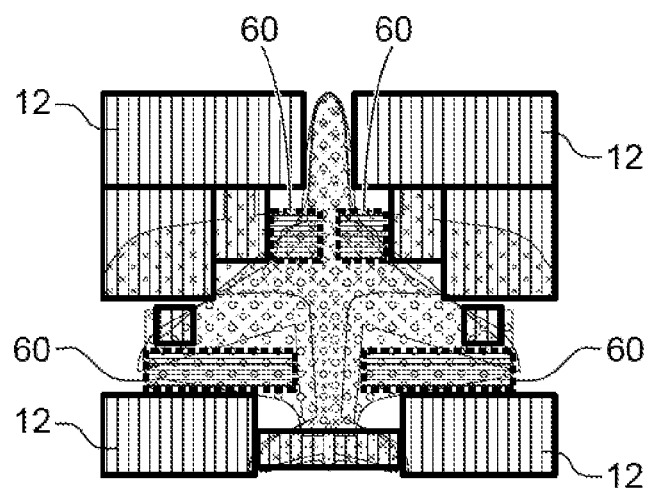

Thus, zones 40 specific to class 2 are isolated in FIG. 6A, zones 50 specific to class 4 are isolated in FIG. 6B, and zones 60 specific to class 6 are isolated in FIG. 6C.

Note that the algorithm will reuse previously defined zones as much as possible in order to optimise execution calculation times.

The invention claimed is:

1. Attribute selection method for statistical learning of descriptors intended to enable automatic recognition and/or automatic detection of an object from a set of images, method characterized by the following steps:
   - obtain a mask of the object in each image containing said object to be recognised,
   - define at least one set of descriptors using their geometric shape and/or apparent specific physical characteristics,
   - select at least one set of descriptors as a function of their geometric shape and/or apparent specific physical characteristics,
   - calculate attributes associated with these descriptors and said specific physical characteristics,
   - for each descriptor and for each image, define a semantic conformity score with the mask of the object to be recognised in the image previously calculated representing the conformity level of the geometric shape of said descriptor with the mask of the object to be recognised in the image,
   - sort the descriptors as a function of their corresponding scores,
   - select descriptors with the highest scores to perform said statistical learning,
   - measure a statistical property on a combination of adjacent geometric shapes and non-adjacent geometric shapes, using said descriptors,
   - focus on the most specific zones in each of the classes as iterations in the learning phase continue, in order to eliminate background zones (12) at the beginning of the processing and to discriminate between classes at the end of the processing.

2. Method according to claim 1, in which said geometric shapes are rectangles.

3. Method according to claim 2, in which the statistical property measurement is obtained from a histogram difference.

4. Method according to claim 1, in which the mask of the object to be recognised in the image is obtained by image synthesis.

5. A non-transitory recording medium containing a computer program that, when run by a computer, performs the method according to claim 1.

* * * * *

UNITED STATES PATENT AND TRADEMARK OFFICE
CERTIFICATE OF CORRECTION

PATENT NO. : 8,626,687 B2  Page 1 of 1
APPLICATION NO. : 13/201287
DATED : January 7, 2014
INVENTOR(S) : Perrotton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 208 days.

Signed and Sealed this
Twenty-second Day of September, 2015

Michelle K. Lee
*Director of the United States Patent and Trademark Office*